United States Patent
Van Heeswijk et al.

(10) Patent No.: US 7,005,030 B2
(45) Date of Patent: Feb. 28, 2006

(54) PRINTING AND LAMINATING APPARATUS

(75) Inventors: Frederic Simon Van Heeswijk, Amerstoort (NL); Francisco Javier Pozuelo, Barcelona (ES); Roberto Guillen, Sabadell (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/438,218

(22) Filed: May 15, 2003

(65) Prior Publication Data

US 2004/0007320 A1    Jan. 15, 2004

(30) Foreign Application Priority Data

May 17, 2002 (GB) .................................... 0211248

(51) Int. Cl.
*B32B 31/00* (2006.01)
*B41F 13/54* (2006.01)

(52) U.S. Cl. ................. 156/277; 156/387; 101/228
(58) Field of Classification Search ............. 156/277, 156/324, 384, 387; 347/101, 104; 101/407, 101/415.1, 474; 271/7, 194, 195
See application file for complete search history.

(56) References Cited

U.S. PATENT DOCUMENTS

| | | | | |
|---|---|---|---|---|
| 4,239,371 A | * | 12/1980 | Igarashi et al. | 399/169 |
| 4,780,742 A | * | 10/1988 | Takahashi et al. | 399/320 |
| 5,210,581 A | * | 5/1993 | Kuzuya | 355/405 |
| 5,368,677 A | * | 11/1994 | Ueda et al. | 156/362 |
| 6,572,100 B1 | * | 6/2003 | Tranquilla | 271/195 |
| 6,585,366 B1 | | 7/2003 | Nagata et al. | |
| 6,663,238 B1 | * | 12/2003 | Kikuchi et al. | 347/102 |
| 2004/0003733 A1 | * | 1/2004 | Guillen et al. | 101/228 |
| 2004/0009025 A1 | * | 1/2004 | Pozuelo et al. | 400/606 |
| 2004/0017466 A1 | * | 1/2004 | Guillen et al. | 347/106 |
| 2004/0036755 A1 | * | 2/2004 | Guillen et al. | 347/104 |
| 2004/0066441 A1 | * | 4/2004 | Jones et al. | 347/101 |

FOREIGN PATENT DOCUMENTS

EP        1076131 A2    2/2001

* cited by examiner

*Primary Examiner*—Melvin Mayes
(74) *Attorney, Agent, or Firm*—Foley & Lardner (57) ABSTRACT

An apparatus includes a printer and a laminator operating in line with said printer, and a feeding device arranged along the media path between the printer and the laminator for feeding to the laminator the media that is outputted from the printer. The feeding device includes an arrangement to cause media advance by friction, such as belts, and an arrangement for generating an air stream, such as fans, arranged facing each other such that the fans urge the media against the belts and the latter drive the media by friction. The media can be fed to the laminator with the correct angle and without skew.

16 Claims, 6 Drawing Sheets

PRINTING AND LAMINATING APPARATUS

The present invention relates to a printing and laminating apparatus provided with a feeding device for feeding the media from the printer towards the laminator.

BACKGROUND OF THE INVENTION

The applicant has developed an apparatus which is able to laminate plots that are outputted by a printing device, in a continuous operation, as described and claimed in co-pending applications by the same applicant and filed on the same day as the present application.

A media, such as a continuous web of paper, is printed in a printing device and then it travels to an integrated laminator device so that at least some of the printed plots are laminated.

During normal operation, e.g. while one plot is being printed and laminated, the media web travels continuously from the outlet of the printer to the inlet of the laminator without being cut or stopped.

However, there are times in which it is necessary to feed to the laminator the leading edge of a printed media.

This may occur for a number of reasons, depending on the mode of operation of the apparatus, as described in the cited co-pending applications.

For example, when a new web or sheet of media is loaded in the apparatus, the printing operation starts on the leading edge of the media, and then this edge leaves the printer and has to be fed to the integrated laminator; in some cases, a web of media is cut between two plots in order to allow the printer to stop and process information related to the incoming plot while the previous printed plot is still travelling through the laminator; in some embodiments of the apparatus, if a plot is not going to be laminated, the web of media is cut at the outlet of the printer and the leading edge of each plot is directed towards the laminator or removed directly from the printer, depending on whether it is going to be laminated or not.

In all these cases, a leading edge of the media needs to be fed or introduced into the laminator.

The introduction of the media into the laminator has to be accurate, in order to avoid defects in the laminating operation and obtain a quality product.

On one hand, any skew of the media at the inlet of the laminator cannot be corrected once the laminator rolls are closed, and will build up and worsen as the media advances through the laminator.

Further, the media should be fed between the laminator rolls straight, flat and at an angle as close as possible to the contact plane of the rolls. However, media is flexible and therefore subject to skew and to forming wrinkles; moreover, the media tends to curl when it is released from the printer, to a greater or smaller extent depending on the density of ink of the plotted image, so any existing curl needs to be neutralised.

Manually feeding the leading edge of the media to the laminator does not fully avoid these problems, and it has the further drawbacks of requiring attended operation of the apparatus and relying on the expertise of the user.

These problems are even more critical in large format printing and laminating apparatus, e.g. apparatus which can handle media widths of 24 inches or more.

In this case, handling of the media is in itself complicated due to its size and behaviour; furthermore, since these printers are generally for professional use, it is desirable to provide unattended operation as far as possible.

DESCRIPTION OF THE INVENTION

According to a first aspect, the invention relates to a printing and laminating apparatus for printing and laminating a media, comprising a printer and a laminator operating in line with said printer, and feeding means arranged along the media path between said printer and said laminator for feeding to said laminator the media that is outputted from said printer, said feeding means comprising means to cause media advance by friction and means for generating an air stream, arranged such that said means for generating an air stream urge the media against said advance means and the latter drive the media by friction.

This allows the media to be fed to the laminator accurately at the desired angle, preferably substantially tangential to the laminator rolls surfaces.

In one embodiment, said means to cause media advance by friction and said means for generating an air stream are arranged on opposite sides of the media path, and preferably they are arranged facing each other.

In one embodiment, said means to cause media advance by friction comprise at least one conveyor belt and said means for generating an air stream comprise at least one fan.

In one embodiment the laminator is arranged substantially below the printer, and a feed direction of said at least one conveyor belt is arranged substantially vertically.

Said fan and said conveyor belt may be arranged so as to define between them a space which narrows from the upper part thereof towards the bottom.

The apparatus may comprise a plurality of conveyor belts arranged in spaced relationship along the width of the media, and a plurality of fans arranged in spaced side-by-side relationship.

In one embodiment the apparatus further comprises deflector means for guiding a leading edge of the media towards the space between the fans and conveyor belts.

The presence of the deflectors makes possible unattended operation of the apparatus, by avoiding the risk that the leading edge of a plot may miss the space between the belts and fans.

In embodiments of the invention, said deflector means comprise a sheet of flexible material removably mounted between an outlet of the printer and the upper edge of the conveyor belts, and/or at least one outer deflector fixed on the upper side of a housing accommodating said fans and projecting outwards, away from the media path.

According to a second aspect, the invention relates to a method for feeding printed media to a laminator which operates in line with a printer, which comprises providing, between the printer and the laminator, means for causing media advance by friction and means for generating an air stream, arranged facing each other such that said means for generating an air stream urge the media against said advance means and the latter drive the media by friction.

In one embodiment of said method, the means to cause media advance by friction comprise at least one conveyor belt and the means for generating an air stream comprise at least one fan.

The method may comprise the steps of: feeding a leading edge of the media leaving the printer towards the laminator; correcting the media skew, preferably by driving said means for causing media advance by friction with a speed higher than the speed of the media in the laminator; forming and maintaining a loose media buffer upstream of said means for causing media advance by friction and means for generating an air stream; and generating a back tension in the media as it enters the laminator, preferably by driving said means for causing media advance by friction with a speed lower than the speed of the media in the laminator.

The formation of the media buffer may be carried out by advancing the media through the laminator at a speed that is lower than the speed of advance of the media through the printer, and at the same driving said means for causing media advance by friction at a speed that is lower than said speed of advance of the media through the printer.

Said means for generating an air stream may contribute in drying the printed side of the media.

BRIEF DESCRIPTION OF THE DRAWINGS

Particular embodiments of the present invention will be described in the following, only by way of non-limiting example, with reference to the appended drawings, in which.

DESCRIPTION OF PREFERRED EMBODIMENTS

Figure 1:
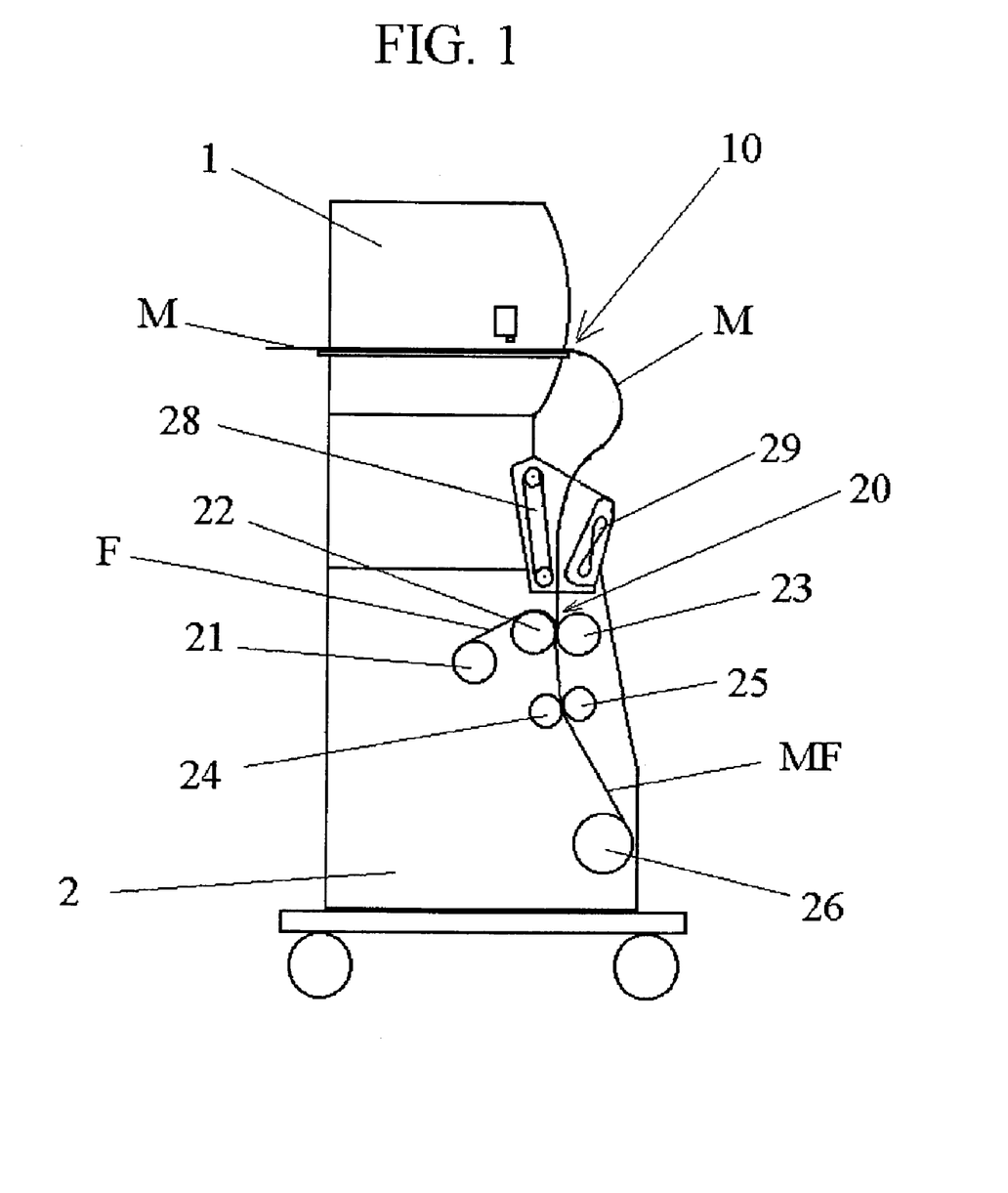
FIG. 1 is a schematic view in side elevation of a printing and laminating apparatus according to an embodiment of the invention.

FIG. 1 shows an embodiment of the present invention in which a printing device 1, for example an inkjet printer, is provided with a laminator device 2 in one integrated apparatus. The laminator will usually perform a thermally activated operation, but it could also use any other kind of process, including cold lamination.

By 'integrated' apparatus it is here meant that the devices 1 and 2 may operate in succession, a media being able to pass from one device to the other, such that the media may be printed and thereafter laminated by the apparatus in a continuous operation, without normally requiring manual intervention: the printer and the laminator may be working simultaneously on different portions of the same continuous plot or web of media.

In the figure, a web of media M is being printed in the printing device 1 and leaves through the outlet 10 thereof, and then enters the laminator 2 through its inlet 20 and traveling through a feeding device 28,29 that will be described with more detail with reference to FIG. 2.

The media M is kept loose in the region between the printer and the laminator, forming a buffer that allows accommodation between the different speed profiles of the printer and the laminator.

In this regard, it should be noted that in order to avoid defects the laminator should not be stopped in the middle of a plot, especially in the case of thermally activated lamination. In contrast, the printing operation may be incremental, for example in the case of an inkjet printer with a reciprocating carriage in which the media is advanced swath by swath and is stationary during printing.

Furthermore, the length of media M between the printer and the laminator is preferably not under tension: since the process works in a continuous manner, i.e. the printer may be printing while the laminator is laminating, it is advisable to avoid 'pulling' the media out of the printer, because this could cause defects in the plot being printed.

The laminator holds at least a roll 21 of a suitable film F; such a film F may comprise a layer of plastic material and a layer of thermally activatable adhesive. There can also be a second roll of film (not shown), if it is desired to laminate both sides of the media.

The laminator 2 also comprises a pair of idle laminator rolls 22 and 23, which can also be referred to as a 'laminating nip', between which the media M and film F are conducted. Rolls 22 and 23 are suitable for applying pressure and heat to the media and film, in order to perform the laminating operation causing the film to adhere to the printed media.

Downstream of the laminator rolls, the laminated media MF, that is, the media M together with the adhered film F, is engaged by a pair of driving rollers 24,25 which cause it to travel through the laminator; downstream of these driving rollers, it is wound on a take-up reel 26.

Laminator rolls 22,23 may be opened and closed, i.e. they may be brought away from each other and closed again; the same occurs with the pair of driving rollers 24,25.

In normal operation, i.e. when a plot is being printed and laminated, the media M printed and outputted by the printing device 1 is pulled into the laminator 2 by the driving rollers 24,25, and is laminated together with one or two films F by applying pressure and heat through the idle laminator rolls 22,23. The laminated media MF is then wound on the take-up reel 26.

When a new sheet or web of media starts to be printed, or when the web of media has been cut and the leading edge of a new plot leaves the outlet 10 of the printer, this leading edge of the media has to enter the laminator with an appropriate angle, ideally tangential to the surfaces of the two laminator rolls 22,23, additionally avoiding skew and wrinkles.

Figure 2:
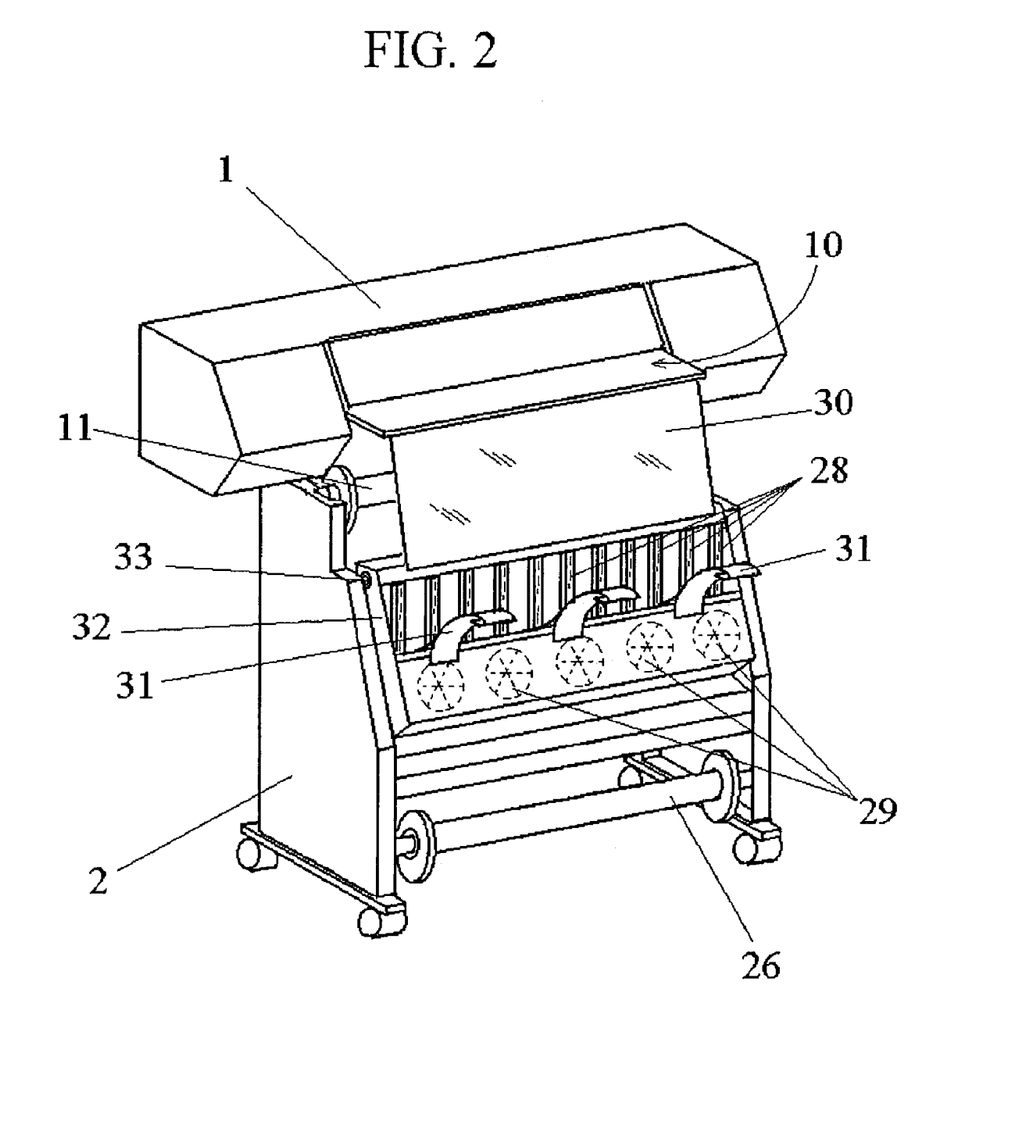
FIG. 2 is a perspective view of an apparatus according to the invention, showing the feeding device.

This is performed automatically by means of a feeding device 28,29 depicted in the perspective view of FIG. 2, which shows an apparatus similar to that of FIG. 1.

FIG. 2 shows the apparatus without any media loaded. The figure shows a blank media reel 11, from which the media is fed to the printer 1, and also the take-up reel 26 described above.

The feeding device includes a plurality of conveyor belts 28 arranged parallel to each other and with their feed path in substantially vertical direction, and a plurality of fans 29 which are arranged side-by-side and facing the conveyor belts 28, the fans and belts being arranged on opposite sides of the media path, upstream of the laminator.

Fans 29 are shown in phantom lines in FIG. 2 because they are not visible in this perspective.

The fans 29 generate an air stream such as to urge the media towards the conveyor belts 28, and the latter are set in motion to guide the leading edge of the media with an adequate orientation.

In the example, the conveyor belts 28 are made of high-friction rubber, and they are about 19 mm wide; they are spaced about 75 mm from each other (between centres), in order to provide enough support and friction surface for the flexible media and at the same time allow air flow between the belts in the region that is not covered by the media when the latter is narrower than the maximum admitted width, thus helping reduce the air flow towards the laminator.

The conveyor belts 28 could be replaced by a different type of transport means able to drive the media by friction, such as an array of wheels with a high-friction surface, e.g. made of rubber.

Similarly, the fans 29 could be replaced by other elements, e.g. a vacuum system arranged behind the conveyor belts to create a depression to attract the media towards the belts by vacuum.

The fans system, vacuum system or other air stream generating system could be located in a different position in the apparatus, and the air stream could be conducted towards the media and the belts by means of tubing.

In order to prevent the edge of the media leaving the printer from missing the space between the fans and belts, the apparatus further comprises deflectors 30 and 31 arranged at either sides of the media path upstream of the fans and belts.

The deflectors allow unattended operation of the apparatus; they are not needed if a user manually guides the leading edge of the media to enter the space between conveyor belts 28 and fans 29.

In the embodiment shown in FIG. 2, deflector 30 is a sheet of flexible material, such as plastic, removably mounted between the outlet 10 of the printer and the upper edge of the belts 28. Deflector 30 prevents the leading edge of the media from deviating towards the apparatus, where it could get caught in the media feed roll or in other parts of the device. The deflector 30 is removable in order to allow access to the inner parts of the apparatus, and it could be replaced by a rigid metal cover or other suitable housing element.

On the other side of the media path, a plurality of outer deflectors 31 prevent the media edge from falling outwards and missing the space between fans 29 and belts 28.

Deflectors 31 are sloped and curved and project outwards, as shown in FIG. 2, so as to conduct the media edge towards the space between the belts and fans: for this purpose, the base of the deflectors 31 is positioned on the housing of the fans, at about 50 mm from the belts 28, while the upper side of the deflectors 31 is spaced about 140 mm from the belts and the deflector 30.

Deflectors 31 are made of a plastic material including about 2% of an antistatic component, and are coated with a sheet of polypropylene about 0.5 mm thick for preventing the deflector from damaging the printed plot when they come into contact.

The described dimensions and surface coating of deflectors 31 are also convenient for the purpose of guiding the trailing edge of the media at the end of a plot, as will be explained later on with reference to FIGS. 8 and 9.

The conveyor belts 28 and fans 29 are arranged in a housing 32 (FIG. 2) which can be pivoted with respect to the apparatus by virtue of a hinge axis 33; this allows access to the inner part of the laminator 2 for maintenance and cleaning operations and in order to load the lamination film, if needed.

The deflectors 31 are mounted on the housing 32, and the lower edge of the deflector 30 also may be removably fixed to it.

The operation of the apparatus with the fans and conveyors system will now be described.

Figure 3:
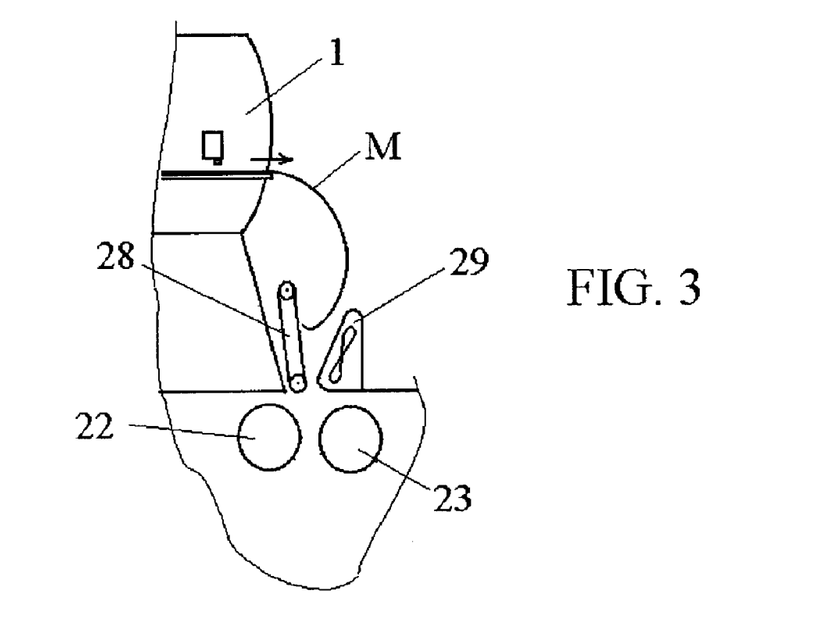
FIGS. 3 to 7 show different steps of the feeding operation.

FIGS. 3 to 7 show different steps of the feeding operation: in FIG. 3, a leading edge of the media M leaving the printer advances towards the laminator with a degree of curling, which will vary from case to case depending e.g. on the type of media and the density of ink in the plot.

Figure 4:
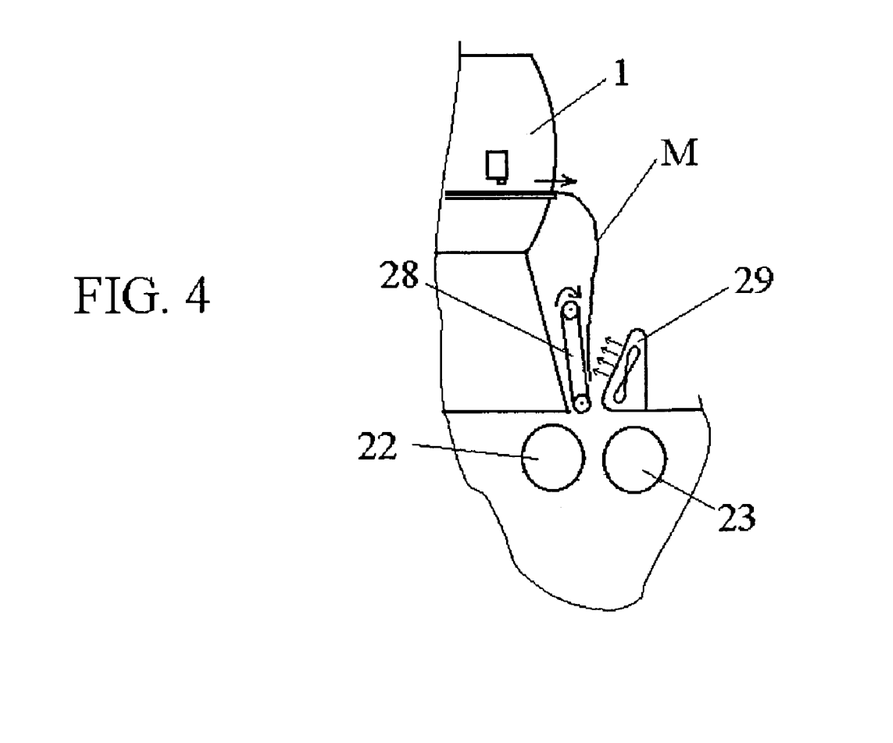

When the media edge reaches the space between the fans 29 and conveyor belts 28, the fans are powered and the belts start to advance in the direction shown by the arrows in FIG. 4, at a speed of about 100 mm/sec, thus faster than the media advance speed, such that the belts tend to pull the media edge downwards and undo the curling, and to straighten the media and exert a degree of downward pulling action thereon; this ensures a more uniform positioning of the media edge along all its width and thus avoids skew of the media when its leading edge enters the laminator.

The fans urge the media towards the belts in order to ensure enough friction between them.

Figure 5:
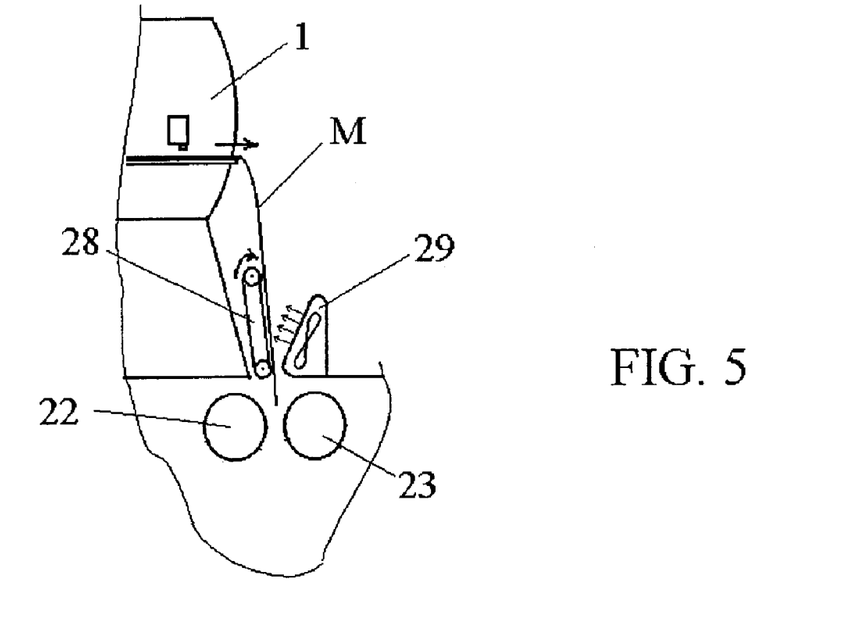
Figure 6:
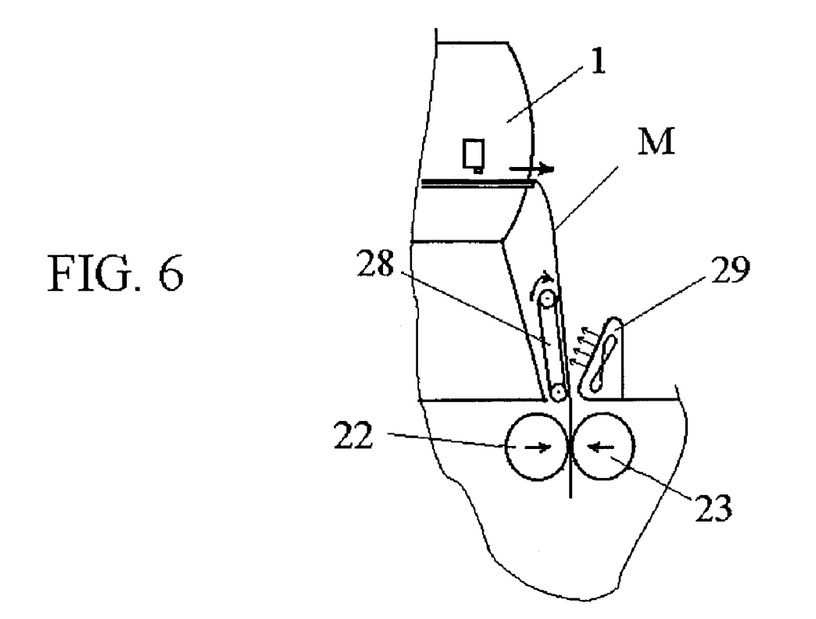

FIG. 5 shows the situation in which the leading edge of the media approaches the lamination rolls 22,23. There are then two possible ways of operation, as described hereinafter.

According to one embodiment, after the leading edge of the media travels through the laminator rolls 22,23 the rolls are closed (FIG. 6) gripping the media M and the film F, the latter not being shown in FIGS. 3 to 7 for the sake of clarity.

According to an alternative embodiment, it is also possible to close the lamination rolls before the media edge reaches them, and start laminating film without media; the conveyor belts feed the media until its leading edge enters between the lamination rolls which are already rotating.

Figure 7:
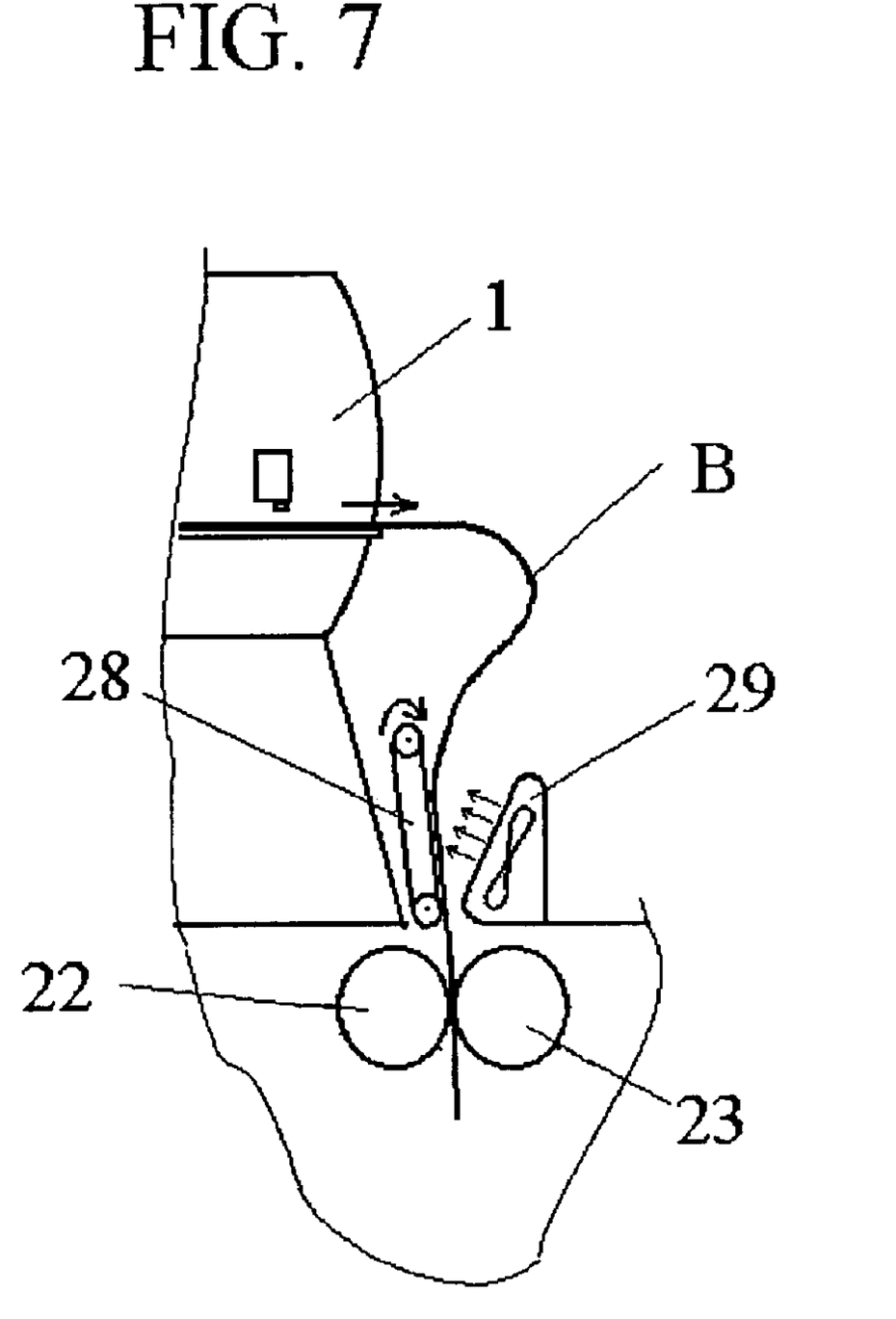

In both cases, once the edge of the media is caught between the laminator rolls, as shown in FIG. 7, the conveyor belts 28 and fans 29 work to form the media buffer B in a position upstream of the feeding system 28,29: for this purpose the conveyor belts 28 and the driving rollers 24,25 of the laminator are slowed down, such that the advance of the media in the laminator is smaller than the advance of the media in the printer, and a length of media buffer is formed.

The air stream generated by the fans 29 and the friction of the media with the belts 28 force the buffer to remain upstream of the feeding system: this allows to control the shape of the buffer and also prevents the printed side of the media from contacting the surfaces of the housing of the apparatus, throughout all the printing and laminating process.

During normal operation of the apparatus, when the printer and the laminator are working on the same plot or web of media, the fans and belts also maintain the correct angle of entrance of the media to the laminator; the fans and belts may also be used to slightly slow down the media in this region (this is done by driving the belts with a speed lower than that of advance of the media in the laminator, or stopping them completely), thereby generating a slight back tension in the media before it enters the laminator: this helps the media enter the laminator free from wrinkles.

Figure 8:
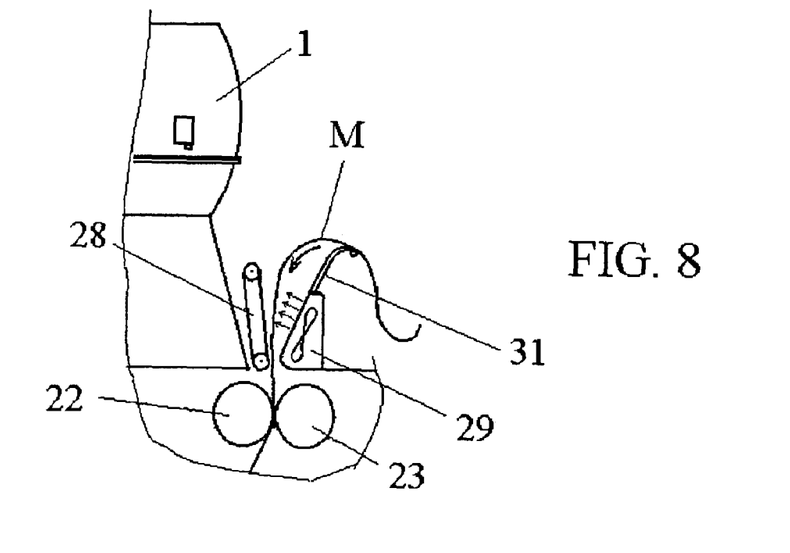
FIGS. 8 and 9 show the feeding device in a different stage of operation.
Figure 9:
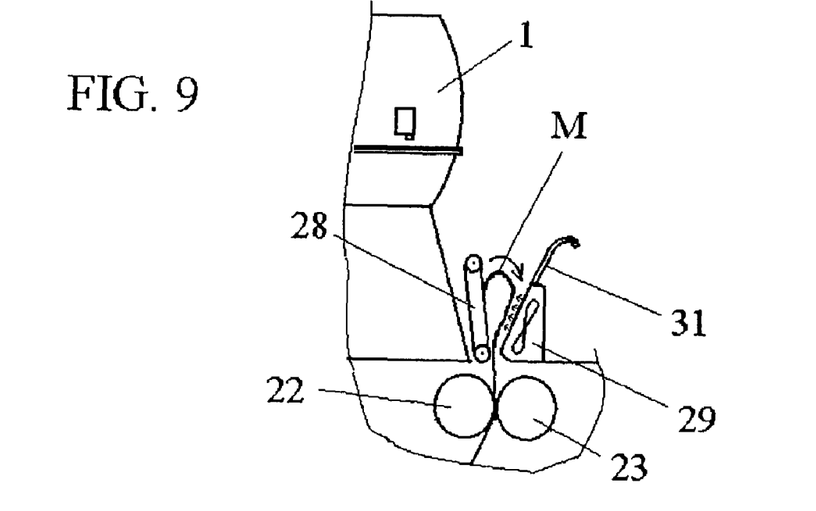

FIGS. 8 and 9 are views similar to those of FIGS. 3 to 7, but show the fans 29 and belts 28 in operation to guide the trailing portion of a plot towards the laminator. In these figures the deflectors 31 have been depicted in order to appreciate their function in this stage of operation.

When the media is cut between two plots, the trailing portion of the plot that is already being laminated falls outwards, as shown in FIG. 8. In this condition, the printed side of the media contacts the deflectors 31: the material and surface finish of these deflectors are adequate for avoiding damaging the printed plot.

As the media travels towards the laminator, and due to curling, the trailing edge of the media enters the space between the fans and belts in the wrong direction, as shown in FIG. 9.

In this situation, the belts are advanced very slowly, and they may even be stopped or driven upwards; thus, the belts function to retain the trailing edge of the media and push it upwards until the rest of the media has gone through the laminator and the trailing edge is pulled by the laminator in the correct direction.

Thus, the fans and belts also have the function of controlling the trailing edge of a plot until it safely enters the laminator.

Finally, the fans may also contribute to some extent to the drying of the printed plot before it is laminated.

The operation of the fans 29 and belts 28 is controlled by the control means of the apparatus (not shown) to be adequately syncronised with the advance of the media in the laminator, the closure of the laminator rolls 22,23 and driving rollers 24,25, and so on.

The conveyor belts 28 may be powered by means of a transmission from the driving rollers 24,25 of the laminator, or they can have an independent drive. The latter case has the advantage of easily allowing higher speeds for the belts in certain steps of operation, which is useful for avoiding skew, as explained above.

The apparatus may include sensor means to control when the leading edge of the media reaches the region of the belts and fans, or alternatively this may be estimated by counting the length of media that has left the printer.

It has to be noted that some functions of the fans 29 and conveyor belts 28 described herein may be useful also in a printing and laminating apparatus in which the media is never cut and in which non-lamination is allowed by opening the lamination rolls and allowing a plot to travel through the laminator without being laminated, as described in one of the mentioned co-pending applications. In this case, for example, the fans and belts may be employed as described above to align the media correctly, avoiding skew, before the laminator rolls are closed again for laminating the next plot.

It may also be pointed out that deflectors 30 and 31 are not essential for the operation of the apparatus, but they are useful in allowing fully unattended operation from the beginning of the printing operation.

What is claimed is:

1. A printing and laminating apparatus for printing and laminating a media, comprising a printer and a laminator operating in line with said printer, wherein the media follows a media path between the printer and the laminator, the apparatus further comprising feeding means arranged along said media path between the printer and the laminator for feeding to said laminator the media that is outputted from said printer, said feeding means comprising means to cause media advance by friction and means for generating an air stream, arranged such that said means for generating an air stream urge the media against said advance means and the latter drive the media by friction,
    wherein said means to cause media advance by friction comprise at least one conveyor belt and said means for generating an air stream comprise at least one fan.

2. An apparatus as claimed in claim 1, wherein the laminator is arranged substantially below the printer, and wherein said at least one conveyor belt defines a media feed direction, the conveyor belt being arranged such that said feed direction is arranged substantially vertically.

3. An apparatus as claimed in claim 1, wherein said fan and said conveyor belt are arranged so as to define between them a space which narrows from the upper part thereof towards the bottom.

4. An apparatus as claimed in claim 1, comprising a plurality of conveyor belts arranged in spaced relationship along the width of the media, and a plurality of fans arranged in spaced side-by-side relationship.

5. An apparatus as claimed in claim 1, wherein the media leaving the printer has a leading edge and wherein a space is defined between the fans and the conveyor belts, the apparatus further comprising deflector means for guiding said leading edge of the media towards said space between the fans and conveyor belts.

6. An apparatus as claimed in claim 5, wherein the printer has a media outlet and the conveyor belts have an upper edge, and wherein said deflector means comprise a sheet of flexible material removably mounted between said outlet of the printer and the upper edge of the conveyor belts.

7. An apparatus as claimed in claim 5, wherein said fans are accommodated in a housing having an upper side, and wherein said deflector means comprise at least one outer deflector fixed on the upper side of said housing and projecting outwards away from the media path.

8. A method for feeding printed media to a laminator which operates in line with a printer, which comprises:
    providing, between the printer and the laminator, means for causing media advance by friction and means for generating an air stream, arranged facing each other such that said means for generating an air stream urge the media against said advance means and the latter drive the media by friction, and
    forming and maintaining a loose media buffer upstream of said means for causing media advance by friction and means for generating an air stream.

9. A method as claimed in claim 8, wherein said means to cause media advance by friction comprise at least one conveyor belt and said means for generating an air stream comprise at least one fan.

10. A method as claimed in claim 8, wherein the media leaving the printer has a leading edge, said method comprising the step of feeding said leading edge towards the laminator.

11. A method as claimed in claim 8, wherein the media leaving the printer may be subject to a skew, said method comprising the step of correcting the media skew.

12. A method as claimed in claim 11, wherein the media advances through the laminator with a speed, and said step of correcting the media skew is carried out by driving said means for causing media advance by friction with a speed higher than said speed of the media in the laminator.

13. A method as claimed in claim 8, wherein the media advances in the printer with a speed, and said formation of the media buffer is carried out by advancing the media through the laminator at a speed that is lower than said speed of advance of the media through the printer, and at the same driving said means for causing media advance by friction at a speed that is lower than said speed of advance of the media through the printer.

14. A method as claimed in claim 8, which comprises generating a back tension in the media as it enters the laminator.

15. A method as claimed in claim 14, wherein the media advances through the laminator with a speed, and said generation of back tension in the media is carried out by driving said means for causing media advance by friction with a speed lower than the speed of the media in the laminator.

16. A method as claimed in claim 8, wherein said means for generating an air stream contribute in drying the printed side of the media.

\* \* \* \* \*